(12) United States Patent
Moon

(10) Patent No.: US 7,333,251 B2
(45) Date of Patent: *Feb. 19, 2008

(54) HOLOGRAPHIC DATA RECORDING APPARATUS AND METHOD

(75) Inventor: Jin Bae Moon, Seoul (KR)

(73) Assignee: Daewoo Electronics Corporation, Seoul (KR)

( * ) Notice: Subject to any disclaimer, the term of this patent is extended or adjusted under 35 U.S.C. 154(b) by 308 days.

This patent is subject to a terminal disclaimer.

(21) Appl. No.: 11/029,545

(22) Filed: Jan. 6, 2005

(65) Prior Publication Data

US 2005/0270610 A1 Dec. 8, 2005

(30) Foreign Application Priority Data

Jun. 8, 2004 (KR) ............... 10-2004-0041888
Aug. 3, 2004 (KR) ............... 10-2004-0061144

(51) Int. Cl.
*G03H 1/10* (2006.01)
*G03H 1/26* (2006.01)

(52) U.S. Cl. ............... 359/10; 359/22; 359/900
(58) Field of Classification Search ............ 359/1, 359/10, 22, 24, 35, 900, 25
See application file for complete search history.

(56) References Cited

U.S. PATENT DOCUMENTS

| | | | |
|---|---|---|---|
| 5,322,747 A | 6/1994 | Hugle | |
| 6,331,904 B1 | 12/2001 | Daiber et al. | |
| 6,980,337 B2 * | 12/2005 | Roh | 359/10 |
| 2003/0161246 A1 | 8/2003 | Chuang | |
| 2004/0085600 A1 | 5/2004 | Kim | |
| 2004/0190358 A1 * | 9/2004 | Cho | 365/222 |
| 2005/0270605 A1 * | 12/2005 | Moon | 359/3 |

FOREIGN PATENT DOCUMENTS

EP 1 607 982 A 12/2005

* cited by examiner

Primary Examiner—Alessandro Amari
(74) Attorney, Agent, or Firm—Bacon & Thomas, PLLC

(57) ABSTRACT

A holographic data recording apparatus includes: a signal beam patterning unit for irradiating a signal beam onto a holographic medium, the signal beam including a data pattern to be recorded; a cylindrical optical body including a cylindrical reflective surface, by which a first and a second reference beams alternatively incident thereto at incident angles are reflected toward the holographic medium, alternatively; and an incident angle control unit for controlling the incident angles of the first and the second reference beams incident on the cylindrical optical body, wherein the data, pattern is recorded on the holographic medium by interfering the signal beam with the first and the second reference beams on the holographic medium. The holographic data recording apparatus do not require the replacement of the conventional conical mirrors while recording a plurality of data on a holographic medium, thereby increasing the recording speed and reducing the manufacturing cost thereof.

18 Claims, 10 Drawing Sheets

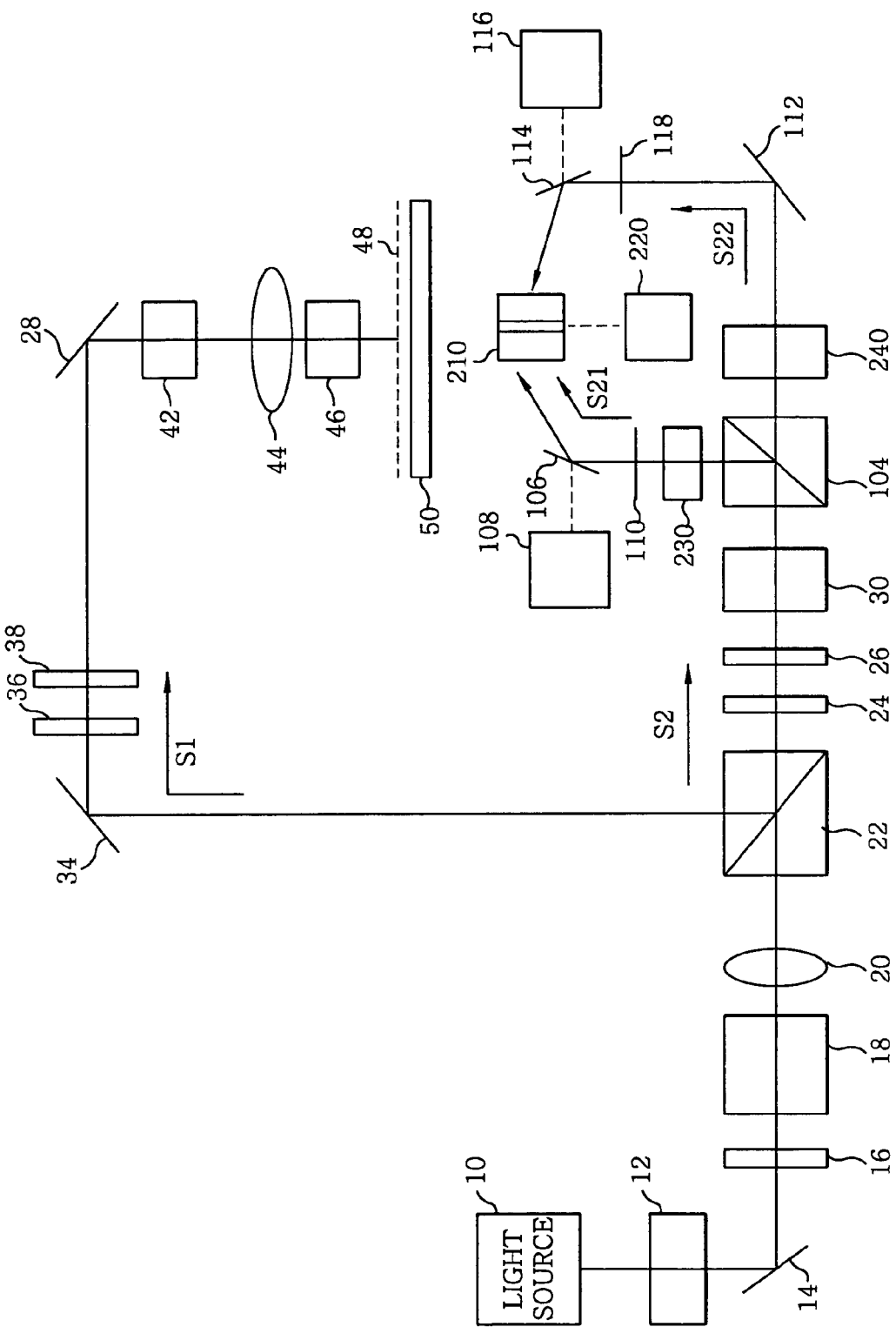

US 7,333,251 B2

HOLOGRAPHIC DATA RECORDING APPARATUS AND METHOD

FIELD OF THE INVENTION

The present invention relates to holographic data recording apparatus and method; and more particularly, to holographic data recording apparatus and method capable of recording a plurality of holographic data in a holographic medium by angular multiplexing using a cylindrical optical body.

BACKGROUND OF THE INVENTION

Conventional holographic memory systems normally employ a page-by-page storage approach. An input device such as SLM (spatial light modulator) presents recording data in the form of a two dimensional array (referred to as a page), while a detector array such as CCD camera is used to retrieve the recorded data page upon readout. Other architectures have also been proposed wherein a bit-by-bit recording is employed in lieu of the page-by-page approach. All of these systems, however, suffer from a common drawback that they require the recording of huge quantities of separate holograms in order to fill the memory to its full capacity. A typical page-oriented system using a megabit-sized array would require the recording of hundreds of thousands of hologram pages to reach the capacity of 100 GB or more. Even with the hologram exposure times of millisecond-order, the total recording time required for filling a 100 GB-order memory may easily amount to at least several tens of minutes, if not hours. Thus, another conventional holographic ROM system has been developed, where the time required to produce a 100 GB-order capacity disc may be reduced to under a minute, and potentially to the order of seconds.

FIG. 1 is a view schematically illustrating a conventional method for recording data on a disc-type holographic medium. As shown in FIG. 1, a data mask 48 is placed above a holographic medium 50 which serves as an optical data storage medium, while a conical mirror 32 is placed below the holographic medium 50. To record data on the holographic medium 50, a signal beam is irradiated downward onto the upper surface of the holographic medium 50 via a bit pattern of the data mask 48 and at the same time, a reference beam is irradiated onto the lower surface of the holographic medium 50 after the reflection by the conical mirror 32. The signal beam is interfered with the reference beam at the holographic medium 50, thereby recording the holographic data on the holographic medium 50 according to the bit pattern of the data mask 48.

When conical mirrors having different base angles are used, it is possible to record a plurality of holographic data in the same physical space of the holographic medium 50 by angular multiplexing (see "Holographic disk recording system", U.S. patent application publication No. US2003/0161246A1, by Ernest Chuang, et al.).

FIG. 2 shows a conventional holographic ROM system including a light source 10; a shutter 12; mirrors 14, 28, 34, 40; HWPs (half wave plates) 16, 24, 36; spatial filters 18, 30, 42; lenses 20, 44; a PBS (polarization polarization beam splitter) 22; polarizers 26, 38; a conical mirror 32; a data mask 48; and a holographic medium 50.

The light source 10 emits a laser beam with a constant wavelength, e.g., a wavelength of 532 nm. The laser beam, which is of only one type of linear polarization, e.g., P-polarization or S-polarization, is provided to the mirror 14 via the shutter 12 which is opened to transmit the laser beam therethrough when recording data on the holographic medium 50. The mirror 14 reflects the laser beam to the HWP 16. The HWP 16 rotates the polarization of the laser beam by θ degree (preferably 45°). And then, the polarization-rotated laser beam is fed to the spatial filter 18 for removing noises included in the polarization-rotated laser beam. And then, the polarization-rotated laser beam is provided to the lens 20 for expanding the beam size of the laser beam up to a predetermined size. Thereafter, the expanded laser beam is provided to the PBS 22.

The PBS 22, which is manufactured by repeatedly depositing at least two kinds of materials each having a different refractive index, serves to transmit, e.g., a horizontally polarized laser beam, i.e., P-polarized beam, along a S1 path and reflect, e.g., a vertically polarized laser beam, i.e., S-polarized beam, along a S2 path. Thus the PBS 22 divides the expanded laser beam into a transmitted laser beam (hereinafter called a reference beam) and a reflected laser beam (hereinafter called a signal beam) having different polarizations, respectively.

The signal beam, e.g., of a S-polarization, is reflected by the mirror 34. And then the reflected signal beam is provided to the mirror 40 via the HWP 36 and the polarizer 38 sequentially. Since the HWP 36 can rotate the polarization of the signal beam by θ' degree and the polarizer 38 serves to pass only a P-polarized signal beam, the HWP 36 and the polarizer 38 can regulate the amount of the P-polarized signal beam arriving at the mirror 40 by changing θ'. And then the P-polarized signal beam is reflected by the mirror 40 toward the spatial filter 42 for removing spatial noise of the signal beam and allowing a Gaussian beam thereof to be transmitted therethrough. And then the signal beam which is a perfect Gaussian is provided to the lens 44 for expanding the beam size of the signal beam up to a preset size. Thereafter, the expanded signal beam is projected onto the holographic medium 50 via the data mask 48. The data mask 48, presenting data patterns for recording, functions as an input device, e.g., a spatial light modulator (SLM).

Meanwhile, the reference beam is fed to the mirror 28 via the HWP 24 and the polarizer 26 sequentially. Since the HWP 24 can rotate the polarization of the reference beam by θ" degree and the polarizer 26 serves to pass only a P-polarized reference beam, the HWP 24 and the polarizer 26 can regulate the amount of the P-polarized reference beam arriving at the mirror 28 by changing θ". Therefore, the polarization of the reference beam becomes identical to that of the signal beam. And then the mirror 28 reflects the P-polarized reference beam toward the spatial filter 30 which removes spatial noise of the signal beam and allows a Gaussian beam thereof to be transmitted therethrough. And then the reference beam which is a perfect Gaussian beam is projected onto the conical mirror 32 (the conical mirror 32 being of a circular cone having a circular base with a preset base angle between the circular base and the cone), which is fixed by a holder (not shown). The conical mirror 32 reflects the reference beam toward the holographic medium 50. The incident angle of the reflected reference beam on the holographic medium 50 is determined by the base angle of the conical mirror 32.

When conical mirrors having different base angles are used in the above-mentioned holographic data recording apparatus, it is possible to record holographic data in the same physical space of the holographic medium 50 by angular multiplexing. In other words, another conical mirror having a base angle different from the base angle of the conical mirror 32 is used in the holographic data recording apparatus, in place of the conical mirror 32, the incident angle of the reference beam irradiated onto the holographic medium 50 is changed so that the reference beam and the signal beam provide a new interference pattern. Thus, new holographic data can be recorded on the holographic medium 50 by angular multiplexing.

However, the conventional holographic data recording apparatus is problematic in that, in order to reflect a reference beam toward a disc-type holographic medium at a desired incident angle, it is necessary to use a conical mirror having a specified base angle capable of providing the desired incident angle. Thus, to record a plurality of holographic data on a holographic medium by angular multiplexing, the required number of conical mirrors must be the same as the desired number of the incident angles of the reference beam, so that the cost of the holographic data recording apparatus is increased.

Furthermore, the replacement of every conical mirror is a difficult and complex process so that the recording speed is decreased.

SUMMARY OF THE INVENTION

It is, therefore, an object of the present invention to provide holographic data recording apparatus and method capable of recording a plurality of holographic data in the same physical space of a holographic medium by angular multiplexing, the incident angle of a reference beam being changed by using only one cylindrical optical body, thus increasing the holographic data recording speed and reducing the cost thereof.

In accordance with a first aspect of the present invention, there is provided a holographic data recording apparatus including: a signal beam patterning unit for irradiating a signal beam onto a holographic medium, the signal beam including a data pattern to be recorded; a cylindrical optical body including a cylindrical reflective surface, by which a first and a second reference beams alternatively incident thereto at incident angles are reflected toward the holographic medium, alternatively; and an incident angle control unit for controlling the incident angles of the first and the second reference beams incident on the cylindrical optical body, wherein the data pattern is recorded on the holographic medium by interfering the signal beam with the first and the second reference beams on the holographic medium.

In accordance with a second aspect of the present invention, there is provided a holographic data recording apparatus including: a signal beam patterning unit for irradiating a signal beam onto a holographic medium, the signal beam including a data pattern to be recorded; a half taper-shaped beam generating unit for converting a first and a second reference beams incident thereto into half taper-shaped beams having semicircular cross-sections at each end thereof with the centers of the semicircular cross-sections located at a central axis of the holographic medium, and then alternatively irradiating the first and the second reference beams onto the holographic medium, and an incident angle control unit for controlling the incident angles of the first and the second reference beams irradiated onto the half taper-shaped beam generating unit, wherein the data pattern is recorded on the holographic medium by interfering the signal beam with the first and the second reference beam on the holographic medium.

In accordance with a third aspect of the present invention, there is provided a holographic data recording method for recording a data pattern on a holographic medium by interfering a signal beam having the data pattern with a reference beam, including the steps of: irradiating the first and the second reference beams alternatively onto a cylindrical optical body having a cylindrical reflective surface, by which the first and the second reference beams are alternatively reflected toward the holographic medium, to thereby record the data pattern by interfering the signal beam with the first and the second reference beams on the holographic medium; and varying the incident angles of the first and the second reference beams incident to the holographic medium by controlling the incident angles of the first and the second reference beam irradiated onto the cylindrical optical body, to thereby superposably record a new data pattern on the holographic medium.

In accordance with a fourth aspect of the present invention, there is provided a holographic data recording method including the steps of: splitting a reference beam emitted from a light source into a first reference beam and a second reference beam; irradiating the first and the second reference beams onto an optical body, alternatively, at first symmetrical angles which are symmetrical around a central axis of the optical body; reflecting the first and the second reference beams by the optical body, thereby irradiating the first and the second reference beams onto a holographic medium, alternatively, at second symmetrical angles which are symmetrical around the central axis of the optical body; and interfering the first and the second reference beams with a signal beam including a data pattern thereon on the holographic medium, thereby recording the data pattern on the holographic medium.

In accordance with a fifth aspect of the present invention, there is provided a holographic data recording method including the steps of: splitting a reference beam emitted from a light source into N sub-reference beams; irradiating the sub-reference beams onto an optical body, alternatively, such that the sub-reference beams are directed to a central axis of the optical body; reflecting the sub-reference beams by the optical body, thereby irradiating the sub-reference beams onto a holographic medium, alternatively, at predetermined incident angles which are symmetrical around the central axis of the optical body; and interfering the sub-reference beams with a signal beam including a data pattern thereon on the holographic medium, thereby recording the data pattern on the holographic medium, wherein N is a natural number.

In accordance with a sixth aspect of the present invention, there is provided a holographic data recording apparatus including: a data mask for irradiating a signal beam onto a holographic medium, the signal beam including a data pattern to be recorded; a half cylindrical optical body including a half cylindrical reflective surface, by which a reference beam incident thereto is reflected toward the holographic medium; and a control unit for rotating the data mask and the holographic medium, thereby controlling the reference beam reflected by the half cylindrical reflective surface to be irradiated onto, alternatively, a first and a second recording areas of the holographic medium, wherein the data pattern is recorded on the holographic medium by interfering the signal beam with the reference beam on the holographic medium.

In accordance with a seventh aspect of the present invention, there is provided A holographic data recording method including the steps of: splitting a laser beam emitted from a light source into a signal beam and a reference beam; irradiating the signal beam onto an upper surface of a holographic medium and, at the same time, irradiating the reference beam, after reflected by a reflective surface of a half cylindrical optical body, onto a lower surface of the holographic medium, thereby recording holographic data on a first recording area of the holographic medium; rotating the data mask and the holographic medium by 180°; and irradiating the signal beam onto the upper surface of the holographic medium and, at the same time, irradiating the reference beam, after reflected by the reflective surface of the half cylindrical optical body, onto the lower surface of the holographic medium, thereby recording the holographic data on a second recording area of the holographic medium.

BRIEF DESCRIPTION OF THE DRAWINGS

The above and other objects and features of the present invention will become apparent from the following description of preferred embodiments given in conjunction with the accompanying drawings, in which:

FIG. 9 shows a configuration of a holographic data recording apparatus in accordance with the second preferred embodiment of the present invention;

DETAILED DESCRIPTION OF THE PREFERRED EMBODIMENT

First Preferred Embodiment

Figure 1:
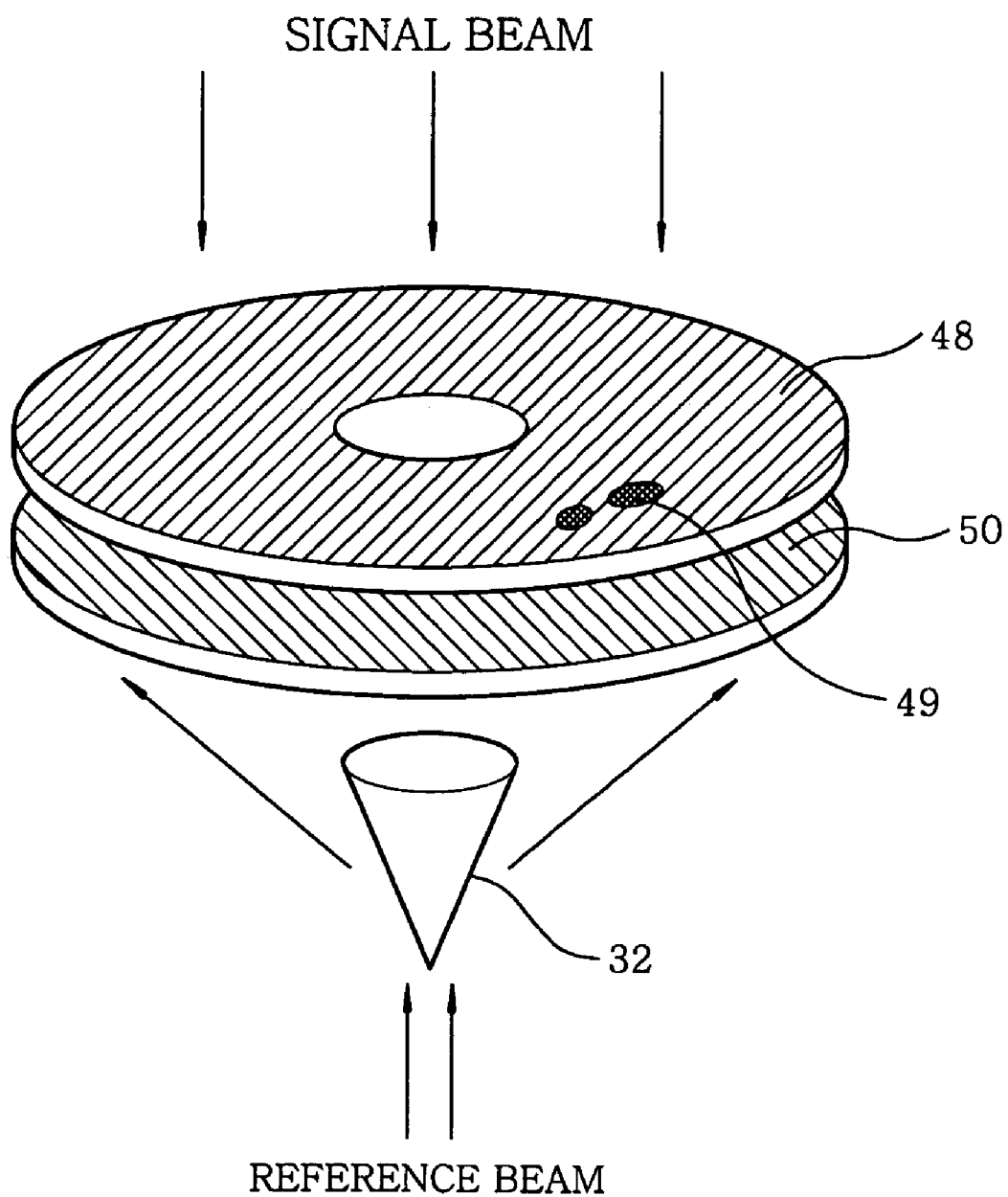
FIG. 1 provides a view schematically illustrating a conventional holographic data recording method.
Figure 2:
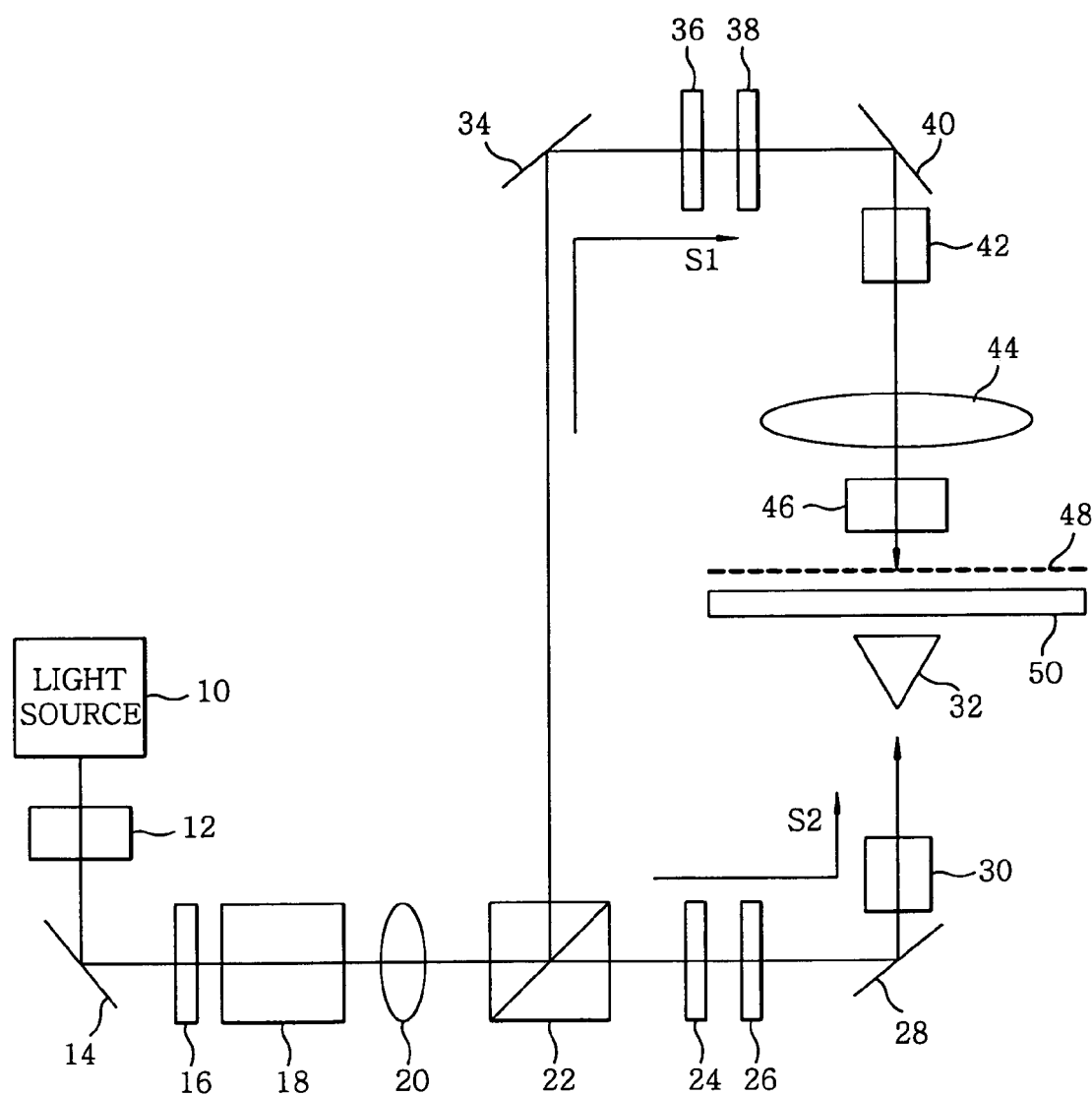
FIG. 2 shows a view illustrating the configuration of a conventional holographic data recording apparatus.
Figure 3:
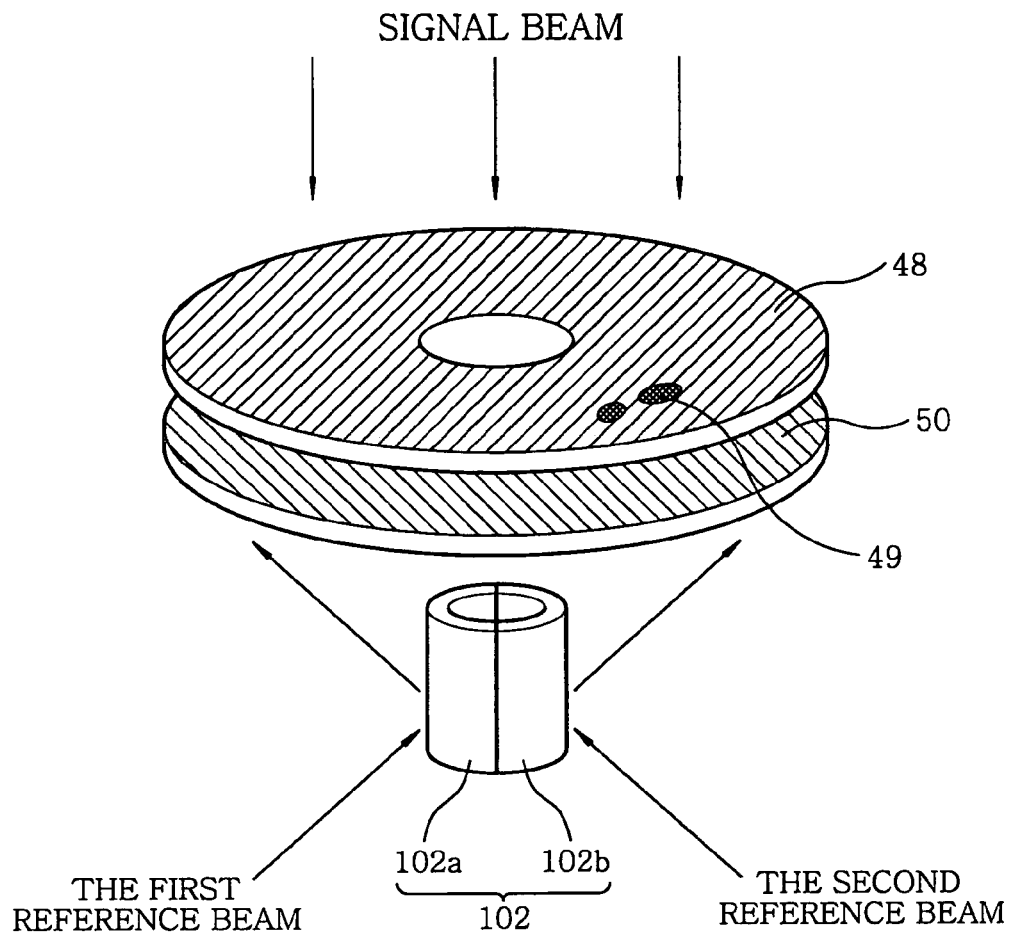
FIG. 3 describes a view schematically illustrating a holographic data recording method in accordance with a first preferred embodiment of the present invention.
Figure 4:
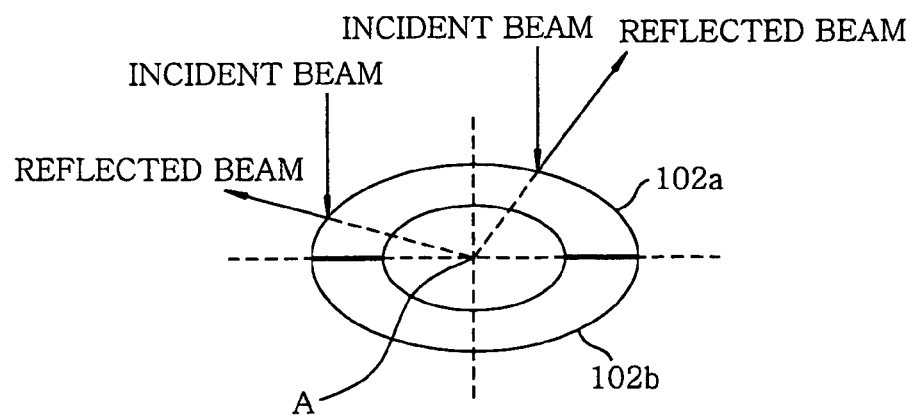
FIG. 4 sets forth a view illustrating optical paths of an incident beam and a reflected beam of a cylindrical optical body in accordance with the first preferred embodiment of the present invention.

FIG. 3 is a drawing schematically illustrating a holographic data recording method in accordance with a first preferred embodiment of the present invention, wherein like parts appearing in FIG. 1 are represented by like reference numerals. Disposed above a holographic medium 50 is a data mask 48 for illuminating a signal beam having a data pattern onto the holographic medium 50. Moreover, disposed below the holographic medium 50 is a cylindrical optical body 102 whose reflective surface which covers 360 angular area is formed by cylindrical mirrors 102a and 102b. A focal axis A of the cylindrical mirrors 102a and 102b having the reflective surface which is formed by combining the two cylindrical mirrors 102a and 102b, as shown in FIG. 4, is disposed on a central axis of the holographic medium 50.

A signal beam is irradiated onto the upper surface of the holographic medium 50 via a bit pattern 49 of the data mask 48. Herein, if a first reference beam is irradiated onto the cylindrical optical body 102 at a predetermined angle, the first reference beam is reflected by the cylindrical optical body 102a toward the holographic medium 50. Due to the optical reflection properties of the cylindrical optical body 102, parallel incident beams projected onto the cylindrical optical body 102 are reflected by the cylindrical optical body 102 as if the reflected beams are emitted from a virtual axis light source which is located at the focal axis A of the cylindrical optical body 102a. Therefore, considering a plan view observed from the holographic medium 50, the first reference beam is irradiated from a central axis of the holographic medium 50 within 180 angular area. Herein, the first reference beam irradiated onto the holographic medium 50 has a half taper-shaped cross-section. The first reference beam has a semicircular optical cross-section at each end thereof, with the center of the semicircular cross-section located at the central axis of the holographic medium 50. Accordingly, when the recording area of the holographic medium 50 is divided into a first recording area and a second recording area on the basis of a contact interface between the cylindrical optical body 102a and the cylindrical optical body 102b, the first reference beam is interfered with the signal beam at the first recording area of the holographic medium 50, to thereby record the holographic data in response to the bit pattern of the data mask 48.

Next, while the first reference beam is prevented from being irradiated onto the cylindrical optical body 102, a second reference beam is irradiated onto the cylindrical optical body 102 in a direction symmetrical to a propagating direction of the first reference beam incident to the cylindrical optical body 102 with respect to the contact interface. Then, the second reference beam is reflected toward the holographic medium 50 by the cylindrical optical body 102b in a direction symmetrical to a propagating direction of the first reference beam reflected toward the holographic medium 50 with respect to the contact interface. The second reference beam is irradiated onto the holographic medium 50 within 180 angular area with respect to the focal axis A and the second reference beam irradiated onto the holographic medium 50 has a half taper-shaped cross-section. The second reference beam has a semicircular optical cross-section at each end thereof, with the center of the semicircular cross-section located at the central axis of the holographic medium 50. As a result, the second reference beam is interfered with the signal beam at the second recording area of the holographic medium 50, to thereby record the holographic data in response to the bit pattern of the data mask 48.

Therefore, in case the incident angles of the first reference beam and the second reference beam alternatively irradiated onto the cylindrical optical body 102 are varied, incident angles of the first reference beam and the second reference beam irradiated onto the holographic medium 50 are also varied so that new holographic data can be superposably recorded on the holographic medium 50 by angular multiplexing.

Figure 5:
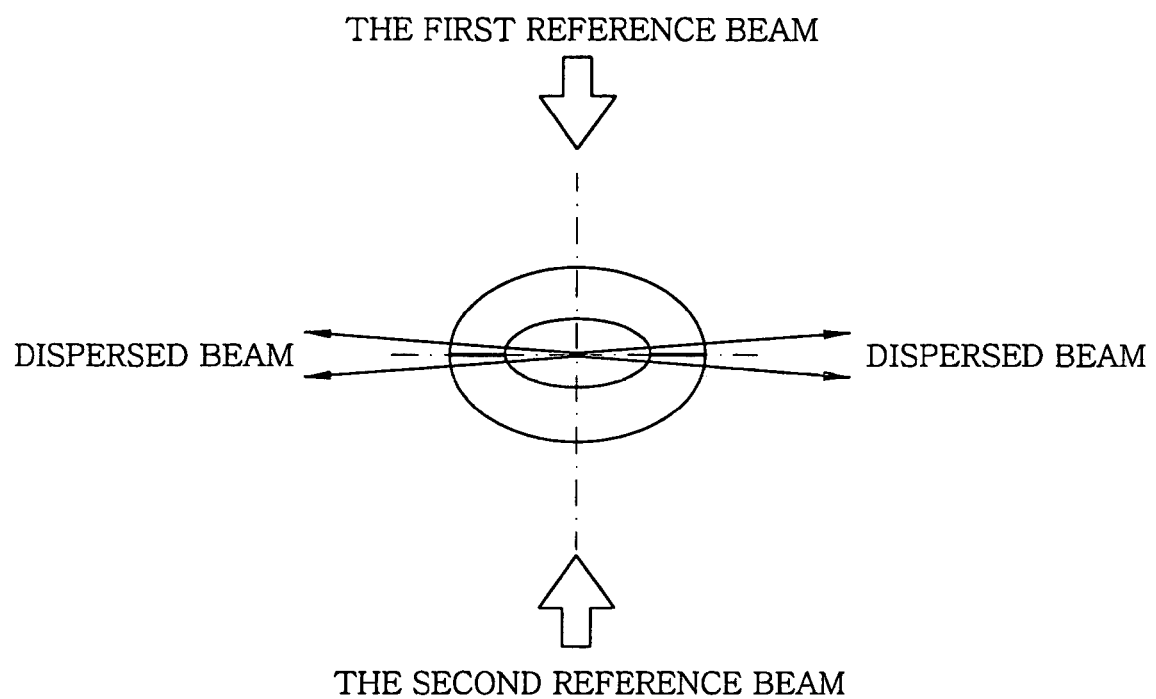
FIG. 5 depicts a view illustrating the reflection of beams at a reflective surface of the cylindrical optical body in accordance with the first preferred embodiment of the present invention.

As mentioned above, the first reference beam and the second reference beam are alternatively irradiated onto the cylindrical optical body 102, because a dispersed beam can be generated in the contact interface between the cylindrical optical body 102a and the cylindrical optical body 102b while the first reference beam and the second reference beam are irradiated onto the cylindrical optical body 102, simultaneously, as shown in FIG. 5.

Figure 6:
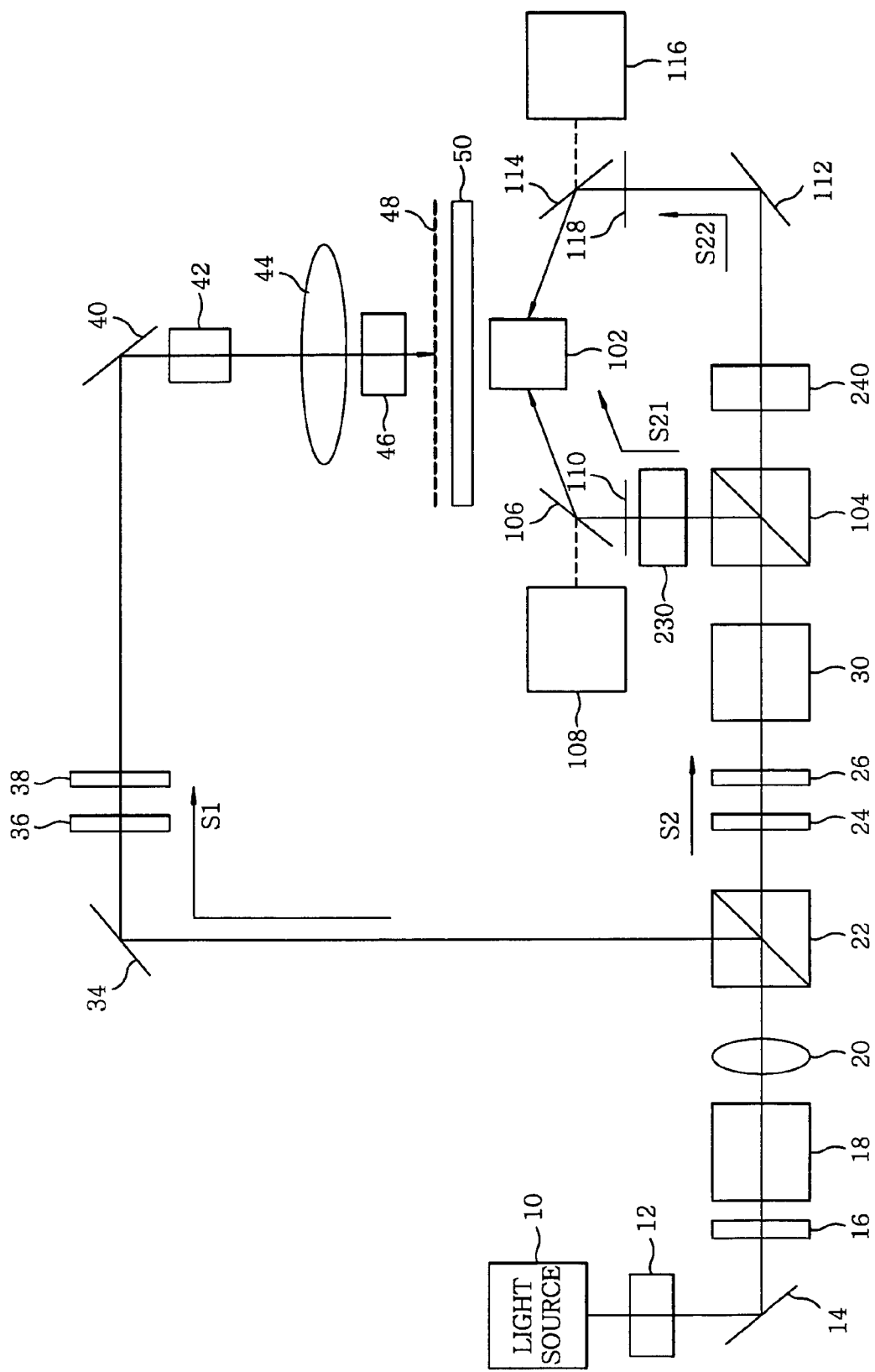
FIG. 6 illustrates a configuration of a holographic data recording apparatus in accordance with the first preferred embodiment of the present invention.

As shown in FIG. 6, the holographic data recording apparatus in accordance with the present invention comprises a light source 10; mirrors 14, 34, 40, 106, 112, 114; polarization beam splitters (PBSs) 22, 104; a cylindrical optical body 102; rectangular slots 110, 118 for forming rectangular beams; a first incident angle control unit 108; a second incident angle control unit 116; a data mask 48; and a holographic medium 50. Moreover, the holographic data recording apparatus further comprises a shutter 12, 230, 240; Half Wave Plates (HWPs) 16, 24, 35; spatial filters 18, 30, 42; magnifying lenses 20, 44; and polarizers 26, 38.

The laser beam emitted from the light source 10 is linear-polarized, e.g., P- or S-polarized. The laser beam emitted from the light source 10 is splitted by the PBS 22 and then propagates along two optical paths S1 and S2. Thereafter, the splitted laser beam propagating along the optical path S2 is splitted by PBS 104 and then propagates along two optical paths S21 and S22.

A signal beam splitted by the PBS 22 propagates along the optical path S1 and then irradiated onto the holographic medium 50 in the same manner as that described for the conventional holographic data recording apparatus of FIG. 1.

A reference beam, splitted by the PBS 22, propagates along the optical path S2, i.e., passes through the HWP 24, the polarizer 26, the spatial filter 30, the PBS 104 in that order. The reference beam is splitted by the PBS 104 into a first reference beam which is propagating along the optical path S21 and a second reference beam which is propagating along the optical path S22.

On the optical path S21, the first reference beam may be provided (or not provided) to the rectangular slot 110 by opening (or by closing) the shutter 230. In case the first reference beam is transmitted to the rectangular slot 110, the first reference beam in the form of a circular beam is converted into a first reference beam in the form of a rectangular beam by the rectangular slot 110 and then the first reference beam in the form of the rectangular beam is provided to the mirror 106. Thereafter, the mirror 106 reflects the first reference beam toward the cylindrical optical body 102. At the cylindrical optical body 102, the first reference beam is reflected toward the holographic medium 50.

On the optical path S22, the second reference beam may be provided (or not provided) to the rectangular slot 118 by opening (or by closing) the shutter 240. In case the second reference beam is transmitted to the rectangular slot 118, the second reference beam in the form of a circular beam is reflected by the mirror 112 toward the rectangular slot 118, and then converted into a rectangular beam by the rectangular slot 118 and then the second reference beam in the form of the rectangular beam is provided to the mirror 114. Thereafter, the mirror 114 reflects the second reference beam toward the cylindrical optical body 102. At the cylindrical optical body 102, the second reference beam is reflected toward the holographic medium 50.

Since the signal beam, the first reference beam and the second reference beam which are irradiated onto the holographic medium 50 are controlled to have the same polarization pattern, the signal beam is interfered with the first and the second reference beams on the holographic medium 50. For example, when the signal beam is S-polarized, the first and the second reference beams must also be S-polarized. Furthermore, the first and the second reference beams are irradiated onto the cylindrical optical body 102 at the same incident angle in symmetrical directions with respect to the contact interface, and then reflected by the cylindrical optical body 102 at the same reflection angle in symmetrical directions with respect to the contact interface toward the holographic medium 50.

Considering the plan view of the cylindrical optical body 102 observed at the mirrors 106 and 114 which are respectively placed on the optical paths S1 and S2, the cylindrical optical body 102 looks like a rectangular shape. Thus, when the circular first and second reference beams are converted into the rectangular first and second reference beams by the rectangular slots 110 and 118, the size, i.e., breadth, of each of the rectangular first and second reference beams must be adjusted to be equal to the size, i.e., diameter, of the cylindrical optical body 102. In case the first and the second reference beams are not adjusted to the size of the cylindrical optical body 102, the undesired interference pattern of the signal and the reference beams may be generated on the holographic medium 50.

The holographic data recording apparatus in accordance with the present invention can record new holographic data in the same physical space of the holographic medium 50 by angular multiplexing while controlling arrangement angles of the mirrors 106 and 114 with the shutters 230, 240 alternatively opened/closed, as described in FIG. 3. In other words, when the arrangement angles of the mirrors 106 and 114 are controlled by the first and the second incident angle control units 108 and 116, the incident angles of the first and the second reference beams irradiated onto the cylindrical optical body 102 are changed. Thus, the reflection angles of the first and the second reference beams reflected by the cylindrical optical body 102 are changed so that the incident angles of the first and the second reference beams irradiated onto the holographic medium 50 are also changed. Therefore, the first and the second reference beams whose incident angles are changed are interfered with the signal beam on the holographic medium 50, thereby forming a new interference pattern on the holographic medium 50 by angular multiplexing. In other words, the incident angles of the first and the second reference beams are adjusted every time a new signal beam is irradiated onto the holographic medium 50. Herein, the arrangement angles of the two mirrors 106 and 114 must be adjusted by the first and the second incident angle control units 108 and 116 to be symmetrical with respect to the contact interface.

Second Preferred Embodiment

In the first preferred embodiment described above, the cylindrical optical body 102 is structured by combining the two cylindrical mirrors 102a and 102b together such that the focal axis A of the cylindrical optical body 102 is disposed on the central axis of the holographic medium 50. However, a high processing precision is required for combining the two cylindrical mirrors 102a and 102b together and, as shown in FIG. 5, the dispersed beams can be generated in the contact interface between the cylindrical optical body 102a and the cylindrical optical body 102b in case the cylindrical mirrors 102a and 102b are not accurately combined with each other. Therefore, in the second preferred embodiment, an unreflecting plate having a fixed thickness is inserted between cylindrical mirrors constituting a cylindrical optical body, thereby facilitating the manufacture of the cylindrical optical body and preventing the dispersed beams from being generated at the contact interface between the cylindrical mirrors.

Figure 7:
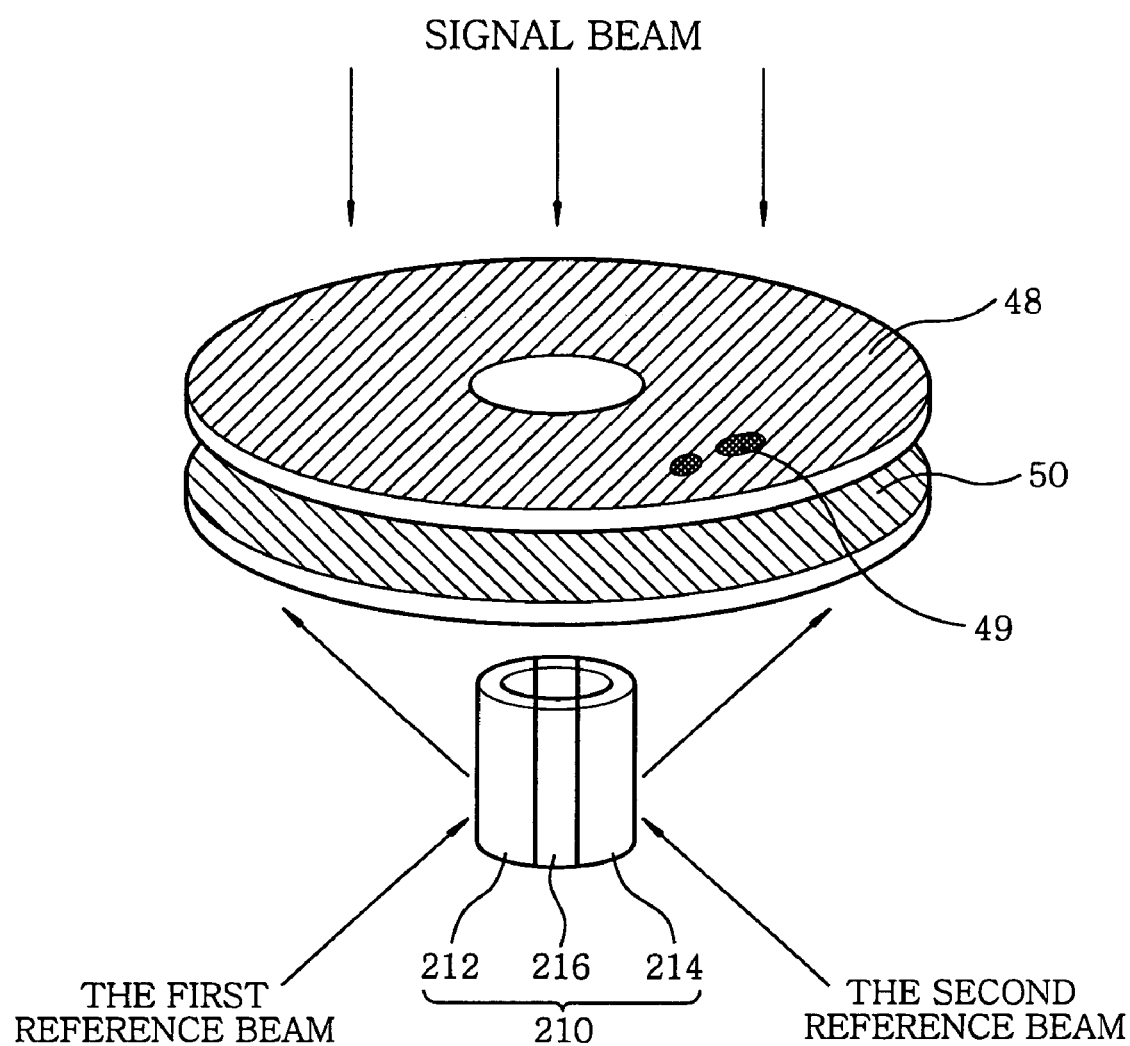
FIG. 7 shows a view schematically illustrating a holographic data recording method in accordance with a second preferred embodiment of the present invention.
Figure 8A:
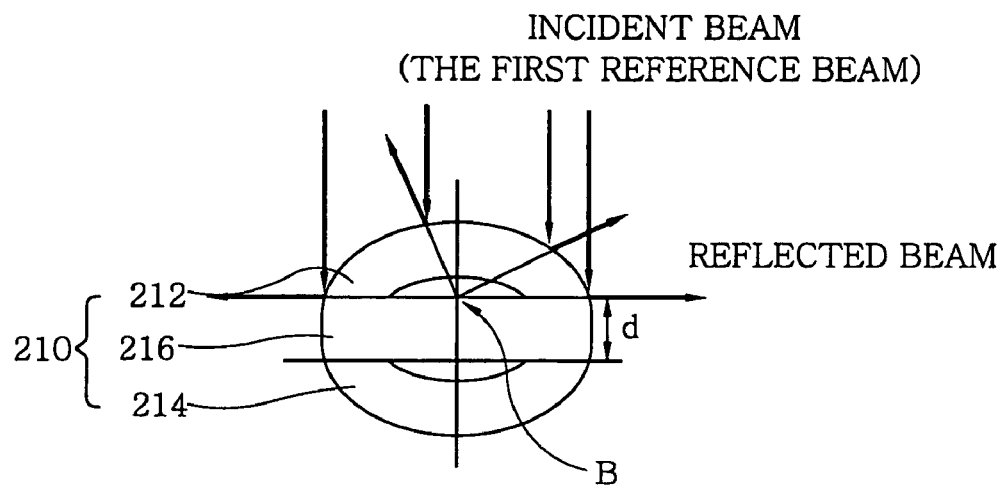
FIGS. 8A and 8B present a view illustrating optical paths of an incident beam and a reflective beam of a cylindrical optical body in accordance with the second preferred embodiment of the present invention.
Figure 8B:
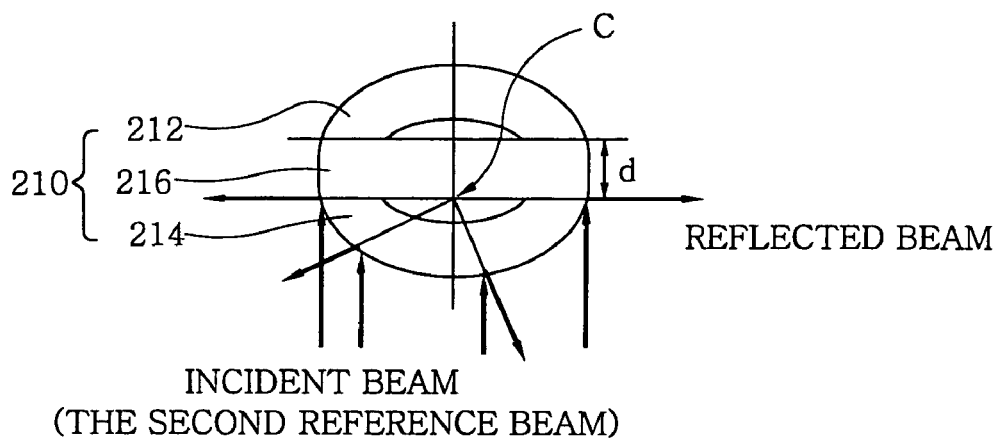

FIG. 7 is a diagram schematically illustrating a holographic data recording method in accordance with the second preferred embodiment of the present invention, wherein like parts appearing in FIG. 3 are represented by like reference numerals. Disposed above a holographic medium 50 is a data mask 48 for illuminating a signal beam having a data pattern on the holographic medium 50. Moreover, disposed below the holographic medium 50 is a cylindrical optical body 210 whose reflective surface which covers 360° angular area is formed by cylindrical mirrors 212 and 214. Referring to FIGS. 8A and 8B, the cylindrical optical body 210 is structured by combining the two cylindrical mirrors 212 and 214 together with an unreflecting plate 216 having a fixed thickness inserted therebetween such that the focal axis B of the cylindrical mirror 212 and the focal axis C of the cylindrical mirror 214 are disposed to have a predetermined separation distance d.

The signal beam is irradiated onto the upper surface of the holographic medium 50 via a bit pattern 49 of the data mask 48. Herein, if a first reference beam is irradiated onto the cylindrical mirror 212 at a predetermined angle while the focal axis B of the cylindrical mirror 212 is positioned on the central axis of the holographic medium 50 and while a second reference beam is prevented from being irradiated, the first reference beam is reflected by the cylindrical mirror 212 toward the holographic medium 50 as shown in FIG. 8A. Due to the optical reflection properties of the cylindrical optical body 102, parallel incident beams projected onto the cylindrical optical body 102 are reflected by the cylindrical optical body 102 as if the reflected beams are emitted from a virtual axis light source which is located at the focal axis B of the cylindrical mirror 212.

Therefore, considering a plan view observed from the holographic medium 50, the first reference beam is irradiated from a central axis of the holographic medium 50 within 180 angular area. Herein, the first reference beam irradiated onto the holographic medium 50 has a half taper-shaped cross-section. The first reference beam has a semicircular optical cross-section at each end thereof, with the center of the semicircular cross-section located at the central axis of the holographic medium 50, as in the first preferred embodiment of the present invention. Accordingly, when the recording area of the holographic medium 50 is divided into a first recording area and a second recording area on the basis of a bisecting surface (a surface perpendicular to a line that connects the focal axes B and C) of the unreflecting plate 216, the first reference beam is interfered with the signal beam at the first recording area of the holographic medium 50, to thereby record the holographic data in response to the bit pattern of the data mask 48.

Next, the position of the focal axis C of the cylindrical mirror 214 is changed to be disposed on the central axis of the holographic medium 50 by shifting the position of the cylindrical optical body 210 as much as the separation distance d. Thereafter, while the first reference beam is prevented from being irradiated onto the cylindrical mirror 212, the second reference beam is irradiated onto the cylindrical mirror 214 in a direction symmetrical to a propagating direction of the first reference beam incident to the cylindrical mirror 212 with respect to the bisecting surface of the unreflecting surface 216 (at the same incident angle). Then, the second reference beam, as shown in FIG. 8B, is reflected toward the holographic medium 50 by the cylindrical mirror 214 in a direction symmetrical to a propagating direction of the first reference beam reflected toward holographic medium 50 with respect to the bisecting surface of the unreflecting plate 216 (at the same reflected angle). The second reference beam is irradiated onto the holographic medium 50 within 180 angular area with respect to the focal axis C and the second reference beam irradiated onto the holographic medium 50 has a half taper-shaped cross-section. The second reference beam has a semicircular optical cross-section at each end thereof, with the center of the semicircular cross-section located at the central axis of the holographic medium 50. As a result, the second reference beam is interfered with the signal beam at the second recording area of the holographic medium 50, to thereby record the holographic data in response to the bit pattern of the data mask 48.

Therefore, the positions of the focal axes B and C of the cylindrical optical body 210 are controlled to be alternatively disposed on the central axis of the holographic medium 50. In detail, the first reference beam is irradiated onto the cylindrical optical body 210 when the focal axis B is disposed on the central axis of the holographic medium 50 and the second reference beam is irradiated onto the cylindrical optical body 210 when the focal axis C is disposed on the central axis of the holographic medium 50. Furthermore, if the incident angles of the first reference beam and the second reference beam illuminated onto the holographic medium 50 are varied, new holographic data can be superposably recorded on the holographic medium 50 by angular multiplexing.

FIG. 9 is a diagram showing a configuration of the holographic data recording apparatus in accordance with the second preferred embodiment of the present invention, wherein like parts appearing in FIG. 6 are represented by like reference numerals. The holographic data recording apparatus in accordance with the second preferred embodiment of the present invention includes a light source 10; mirrors 14, 28, 34, 106, 112, 114; PBSs 22, 104; a cylindrical optical body 210; rectangular slots 110, 118; a first angle controller 108; a second angle controller 116; a position controller 220 for controlling the position of the focal axis of the cylindrical optical body 210; a data mask 48; and a holographic medium 50. Moreover, the holographic data recording apparatus in accordance with the second preferred embodiment of the present invention includes shutters 12, 230, 240; HWPs 16, 24, 36; spatial filters 18, 30, 42; beam expanding lenses 20, 44; and polarizers 26, 38.

The optical paths S1, S21 and S22 in the holographic data recording apparatus in accordance with the second preferred embodiment of the present invention are identical to those of the first preferred embodiment of the present invention as shown in FIGS. 6 and 9 and, thus, the descriptions thereof are omitted.

In the second preferred embodiment of the present invention, the position of the focal axis of the cylindrical optical body 210 to be on the central axis of the holographic medium 50 by the position controller 220 which moves the position of the cylindrical optical body 210. In case the focal axis B of the cylindrical mirror 212 is positioned on the central axis of the holographic medium 50, the only first reference beam is introduced into the cylindrical optical body 210 by opening the shutter 230 and closing the shutter 240. However, in case the focal axis C of the cylindrical mirror 214 is positioned on the central axis of the holographic medium 50, the only second reference beam is introduced into the cylindrical optical body 210 by opening the shutter 240 and closing the shutter 230.

Further, while controlling the positions of the focal axes B and C of the cylindrical optical body 210 to be alternatively disposed on the central axis of the holographic medium 50, the first reference beam and the second reference beam are alternatively introduced into the cylindrical optical body 210. Furthermore, if the incident angle of the first and the second reference beam incident onto the holographic medium 50 is varied, new holographic data can be superposably recorded in the holographic medium 50 by angular multiplexing.

Alternatively, it may be understood that the number of optical paths may be viewed if the optical paths allow a plurality of reference beams to be irradiated onto the entire circumferential surface of the cylindrical optical body. The reference beam can be splitted into N sub-reference beams. Furthermore, it may be understood that the number of mirrors forming the cylindrical optical body may be varied if the integrated reflective surfaces of the cylindrical optical body form the 360°.

Third Preferred Embodiment

Figure 10:
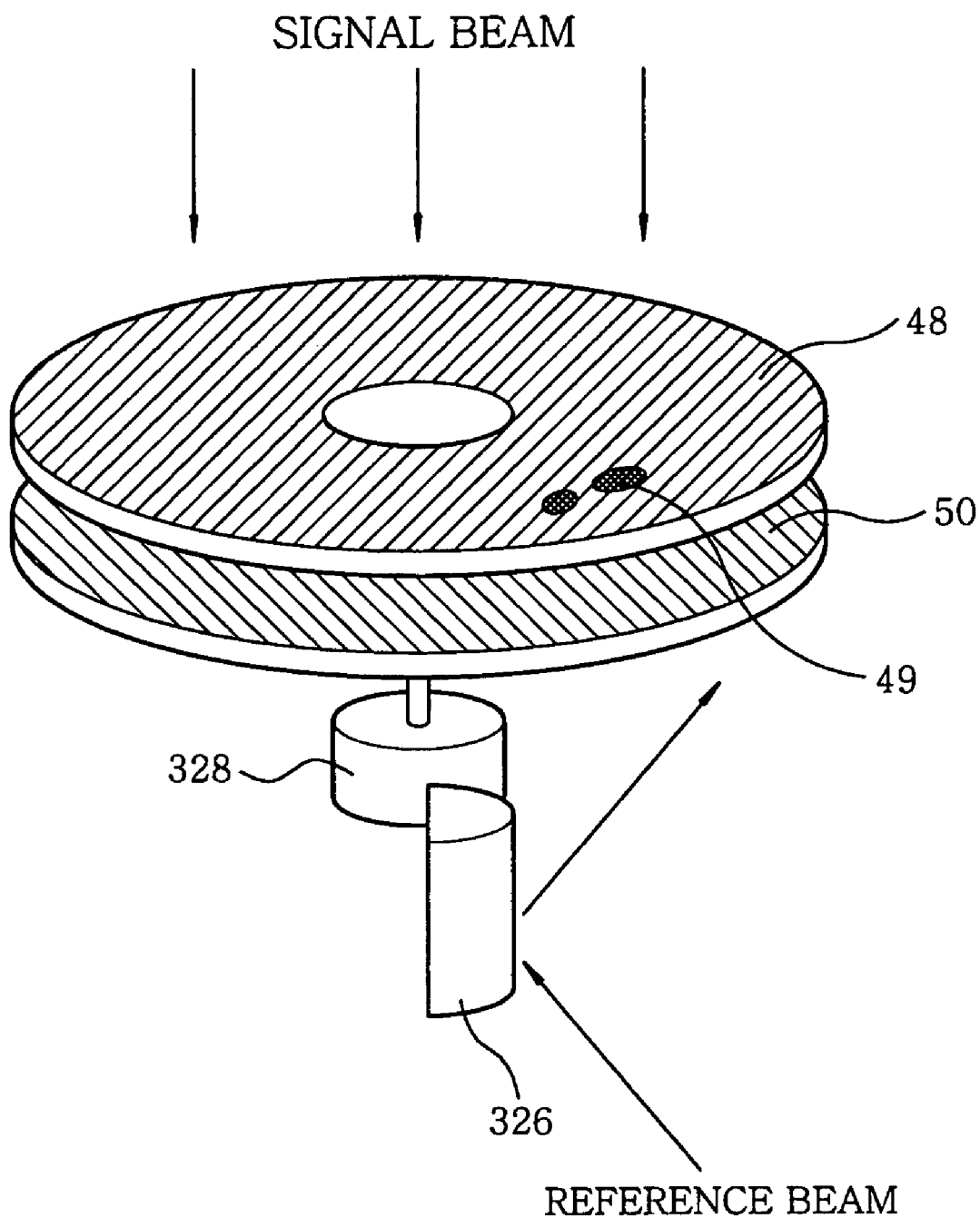
FIG. 10 shows a view schematically illustrating a holographic data recording method in accordance with a third preferred embodiment of the present invention.

FIG. 10 shows a view schematically illustrating a holographic data recording method in accordance with a third preferred embodiment of the present invention. As shown in FIG. 10, the data mask 48 is disposed above the holographic medium 50 and a half cylindrical optical body 326 is disposed below the holographic medium 50. The explanation of the signal beam irradiated onto the holographic medium 50 during the recording operation is abbreviated because it is same as those of the first and the second preferred embodiments.

The reference beam irradiated onto the half cylindrical optical body 326 is reflected by the half cylindrical optical body 326 toward a first half recording area of the holographic medium 50. Herein, a focal axis of the half cylindrical optical body 326 should be located on the central axis of the holographic medium 50.

Therefore, the reference beam reflected by the half cylindrical optical body 326 may be interfered with the signal beam provided from the data mask 48 so that the holographic data can be recorded in the first half recording area of the holographic medium 50.

Then, both data mask 48 and the holographic medium 50 are rotated as much as 180°, wherein the rotation of the holographic medium 50 is executed by driving a spindle motor 328. Thereafter, the reference beam may be interfered with the signal beam so that the holographic data can be recorded in a second half recording area of the holographic medium 50.

Figure 11:
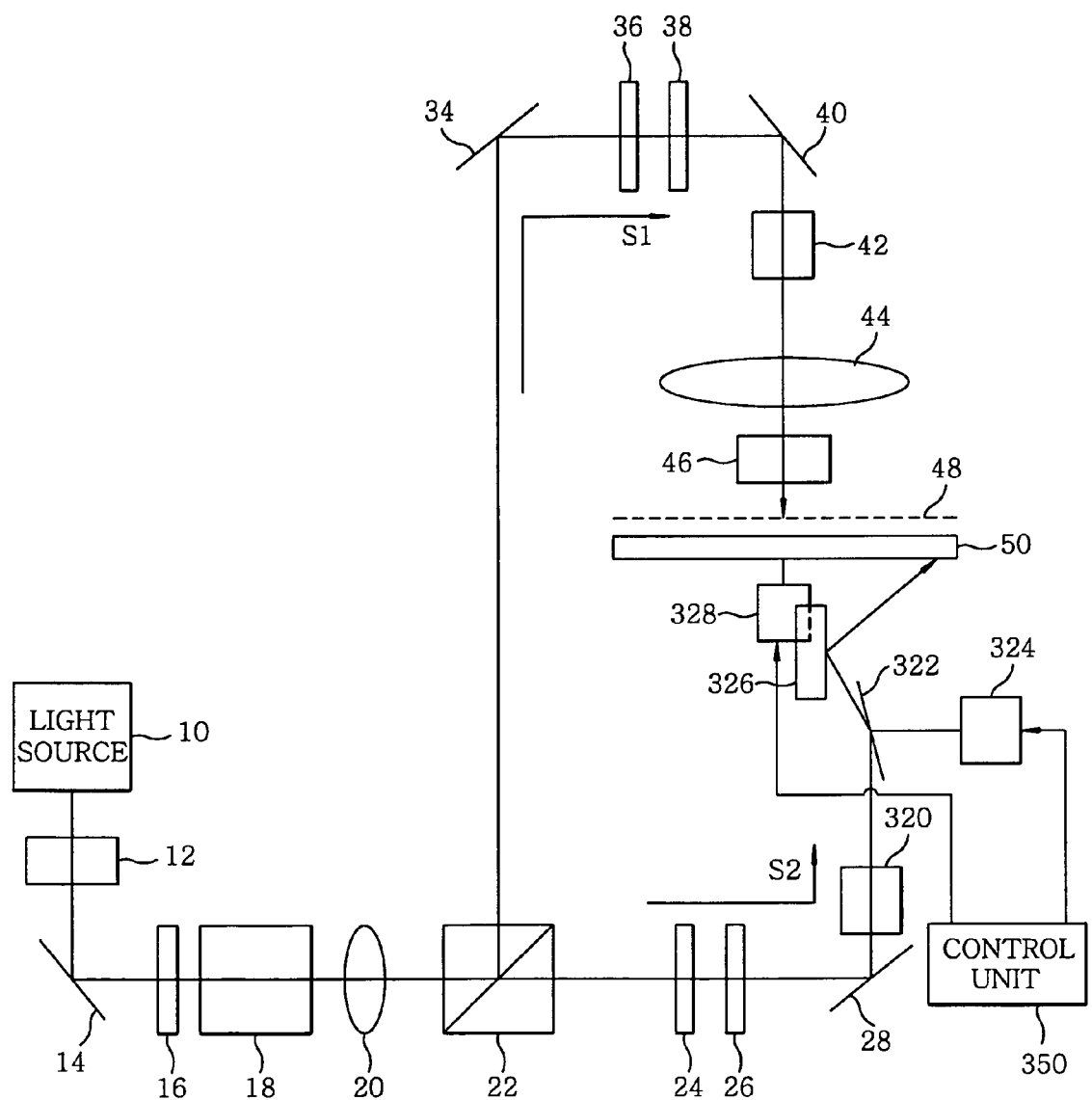
FIG. 11 shows a configuration of a holographic data recording apparatus in accordance with the third preferred embodiment of the present invention.

FIG. 11 shows a configuration of a holographic data recording apparatus in accordance with the third preferred embodiment of the present invention. As shown in FIG. 11, the holographic data recording apparatus includes: a light source 10; mirrors 14, 28, 34, 40, 322; a PBS 22; the half cylindrical optical body 326; the data mask 48; the holographic medium 50; and a control unit 350. Since all elements except the half cylindrical optical body 326, the spindle motor 328, the control unit 350, an actuator 324 are same as those of the first and the second preferred embodiments of the present invention, the detailed explanations thereof are omitted.

After the reference beam passes through the rectangular slot 320, the reference beam with a circular cross section is converted into the reference beam with a rectangular cross section. Then, the reference beam with the rectangular cross section is reflected by the mirror 322 toward a reflective surface, i.e., a cylindrical portion, of the half cylindrical optical body 326. Thereafter, the half cylindrical optical body 326 reflects the reference beam toward the holographic medium 50. Herein, an incident angle of the reference beam irradiated onto the half cylindrical optical body 326 is adjusted by the mirror 322 which may be angularly rotated by the actuator 324 which is controlled by the control unit 350. Therefore, the holographic data can be recorded superposedly by the angular multiplexing.

After the holographic data are recorded on the first half recording area, both the data mask 48 and the holographic medium 50 are rotated as much as 180° by the control unit 350. Thereafter, the reference beam is reflected by the half cylindrical optical body 326 toward the holographic medium 50 so that the holographic data may be recorded on the second half recording area. Herein, while both the data mask 48 and the holographic medium 50 are rotated as much as 180°, the control unit 350 closes the shutter 12, thereby preventing the reference beam and the signal beam from being transmitted to the holographic medium 50. Therefore, the dispersed beam may not be generated. Moreover, in accordance with the third preferred embodiment of the present invention, the manufacturing cost can be reduced because the holographic data are recorded by using only one reference beam.

As described above, the present invention provides the holographic data recording apparatus and method capable of recording a plurality of holographic data in the same physical space of a holographic medium by angular multiplexing using a cylindrical optical body. Unlike the conventional holographic data recording apparatus and method of using a plurality of conical mirrors, the holographic data recording apparatus and method of the present invention do not require the replacement of the conical mirrors while recording a plurality of data on a holographic medium, thereby increasing the recording speed and reducing the cost thereof.

While the invention has been shown and described with respect to the preferred embodiments, it will be understood by those skilled in the art that various changes and modifications may be made without departing from the spirit and scope of the invention as defined in the following claims.

What is claimed is:

1. A holographic data recording apparatus comprising:
   a signal beam patterning unit for irradiating a signal beam onto a holographic medium, the signal beam including a data pattern to be recorded;
   a cylindrical optical body including a cylindrical reflective surface, by which a first and a second reference beams alternatively incident thereto at incident angles are reflected toward the holographic medium, alternatively; and
   an incident angle control unit for controlling the incident angles of the first and the second reference beams incident on the cylindrical optical body,
   wherein the data pattern is recorded on the holographic medium by interfering the signal beam with the first and the second reference beams on the holographic medium.

2. The holographic data recording apparatus of claim 1, wherein the signal beam patterning unit is a data mask having a bit pattern corresponding to the data pattern to be recorded, and the signal beam passes through the bit pattern to be irradiated onto the holographic medium.

3. The holographic data recording apparatus of claim 1, wherein the first and the second reference beams, reflected by the cylindrical optical body and then irradiated onto the holographic medium, are taper-shaped beams having circular cross-sections at each end thereof, with the centers of the circular cross-sections located at a central axis of the holographic medium.

4. The apparatus of claim 1, wherein the first and the second reference beams are alternatively irradiated onto the cylindrical optical body by alternatively opening or closing shutters disposed on optical paths of the first and the second reference beams, respectively.

5. The apparatus of claim 1, wherein the first and the second reference beams irradiated toward the cylindrical optical body are rectangular-shaped.

6. The holographic data recording apparatus of claim 1, further comprising:
a rectangular beam generating unit for converting the first and the second reference beams which are circular-shaped into reference beams which are rectangular-shaped and then irradiating the first and the second reference beams which are rectangular-shaped onto the cylindrical optical body.

7. The holographic data recording apparatus of claim 6, wherein the rectangular beam generating unit is a rectangular slot.

8. The holographic data recording apparatus of claim 1, wherein the cylindrical optical body includes a 360° angular reflective surface, and a focal axis of the cylindrical optical body is disposed on a central axis of the holographic medium.

9. The apparatus of claim 1, wherein the cylindrical optical body is structured such that a plurality of cylindrical mirrors having respective focal axes are combined together with an unreflecting plate inserted therebetween, thereby having a separation distance between the focal axes of the cylindrical mirrors.

10. The apparatus of claim 9, further comprising a position control unit for moving the cylindrical optical body thereby disposing the focal axes to be alternatively on the central axis of the holographic medium.

11. The apparatus of claim 9, wherein the incident angle control unit controls the first and the second reference beams to be irradiated onto the cylindrical optical body at a same incident angle in directions symmetrical with respect to the unreflecting plate.

12. The apparatus of claim 1, further comprising: a light source for emitting a laser beam; a first polarization beam splitting unit for splitting the laser beam into the signal beam and the reference beam; and a second polarization beam splitting unit for splitting the reference beam introduced from the first beam splitting unit into the first reference beam and the second reference beam which are irradiated onto the cylindrical optical body through a first and a second optical paths, respectively.

13. The apparatus of claim 12, wherein the first polarization beam splitting unit or the second polarization beam splitting unit is a polarization beam splitter.

14. The apparatus of claim 1, wherein the incident angle control unit includes: a first incident angle control unit for controlling the incident angle of the first reference beam irradiated onto the cylindrical optical body; and a second incident angle control unit for controlling the incident angle of the second reference beam irradiated onto the cylindrical optical body.

15. The apparatus of claim 14, further comprising: a first mirror for reflecting the first reference beam toward the cylindrical optical body with the incident angle adjusted by the first incident angle control unit and a second mirror for reflecting the second reference beam toward the cylindrical optical body with the incident angle adjusted by the second incident angle control unit.

16. A holographic data recording method for recording a data pattern on a holographic medium by interfering a signal beam having the data pattern with a reference beam, comprising the steps of:
irradiating the first and the second reference beams alternatively onto a cylindrical optical body having a cylindrical reflective surface, by which the first and the second reference beams are alternatively reflected toward the holographic medium, to thereby record the data pattern by interfering the signal beam with the first and the second reference beams on the holographic medium; and
varying the incident angles of the first and the second reference beams incident to the holographic medium by controlling the incident angles of the first and the second reference beam irradiated onto the cylindrical optical body, to thereby superposably record a new data pattern on the holographic medium.

17. The method of claim 16, wherein the incident angles of the first reference beam and the second reference beam irradiated onto the cylindrical optical body are varied under the condition that they are symmetrical with each other with respect to a central axis of the cylindrical optical body.

18. The method of claim 17, wherein the first reference beam and the second reference beam irradiated onto the holographic medium are half taper-shaped beams having semicircular cross-sections at each end thereof with the centers of the semicircular cross-sections located at the central axis of the holographic medium.

* * * * *